United States Patent
Shao et al.

(10) Patent No.: US 12,544,714 B2
(45) Date of Patent: Feb. 10, 2026

(54) GAS RECOVERY SYSTEMS AND METHODS BASED ON INTELLIGENT GAS REGULATORY INTERNET OF THINGS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Bin Liu, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/223,017

(22) Filed: May 29, 2025

(65) Prior Publication Data
US 2025/0288954 A1 Sep. 18, 2025

(30) Foreign Application Priority Data
Feb. 28, 2025 (CN) .......................... 202510230814.2

(51) Int. Cl.
*B01D 53/74* (2006.01)
*G16Y 40/35* (2020.01)
*G06Q 50/26* (2012.01)

(52) U.S. Cl.
CPC .............. *B01D 53/74* (2013.01); *G16Y 40/35* (2020.01); *G06Q 50/26* (2013.01)

(58) Field of Classification Search
CPC .................................. B01D 53/74; G16Y 40/35
See application file for complete search history.

(56) References Cited

FOREIGN PATENT DOCUMENTS

| CA | 2639747 A1 | 3/2009 |
|---|---|---|
| CN | 1830523 A | 9/2006 |
| CN | 109266401 A | 1/2019 |

(Continued)

OTHER PUBLICATIONS

First Office Action in Chinese Application No. 202510230814.2 mailed on Apr. 7, 2025, 26 pages.

(Continued)

*Primary Examiner* — Wayne A Langel
(74) *Attorney, Agent, or Firm* — METIS IP LLC

(57) ABSTRACT

A gas recovery system and method based on an intelligent gas regulatory IoT are provided. The system includes a government regulatory management platform, a government regulatory sensor network platform, a government regulatory object platform including a gas company management platform, a gas company sensor network platform, and a gas device object platform. The method includes obtaining target detection data and target flow data of a pipeline to be recovered from the gas device object platform; determining a gas pollution value based on the target detection data and the target flow data; determining a purification parameter of a purification device based on the gas pollution value and the target flow data; determining a recovery instruction and sending it to at least one user interaction device via the gas device object platform; in response to obtaining a recovery completion instruction, sending the purification parameter to the gas device object platform.

3 Claims, 4 Drawing Sheets

(56) References Cited

FOREIGN PATENT DOCUMENTS

| | | | |
|---|---|---|---|
| CN | 209752513 U | 12/2019 | |
| CN | 211667582 U | 10/2020 | |
| CN | 113531386 A | 10/2021 | |
| CN | 116576556 A | 8/2023 | |
| CN | 118224529 A | 6/2024 | |
| CN | 118887047 A | 11/2024 | |
| CN | 118540361 B * | 2/2025 | ............. B01D 53/04 |

OTHER PUBLICATIONS

Notification to Grant Patent Right for Invention in Chinese Application No. 202510230814.2 mailed on Apr. 25, 2025, 5 pages.
Wang, Yongfeng, Integrated equipment for natural gas filtration, pressure regulation, measurement and tail gas recovery, Chemical Engineering (China), 48(4): 75-78, 2020.

* cited by examiner

200

210
Obtaining target detection data and target flow data of a pipeline to be recovered from a gas device object platform 220
Determining, based on the target detection data and the target flow data, a gas pollution value 230
Determining, based on a gas pollution value and the target flow data, a purification parameter of a purification device 240
Determining a recovery instruction and sending the recovery instruction to at least one user interaction device via a gas device object platform 250
In response to determining that a recovery completion instruction is obtained, sending the purification parameter to a gas device object platform

FIG. 2

GAS RECOVERY SYSTEMS AND METHODS BASED ON INTELLIGENT GAS REGULATORY INTERNET OF THINGS

CROSS-REFERENCE TO RELATED APPLICATIONS

This application claims priority to Chinese Patent Application No. 202510230814.2, filed on Feb. 28, 2025, the entire contents of which are hereby incorporated by reference.

TECHNICAL FIELD

This present disclosure relates to the field of gas recovery technology, and in particular, to gas recovery systems and methods based on an intelligent gas regulatory Internet of Things (IoT).

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 2 is a flowchart illustrating an exemplary gas recovery method based on an intelligent gas regulatory IoT according to some embodiments of the present disclosure;

BACKGROUND

Figure 1:
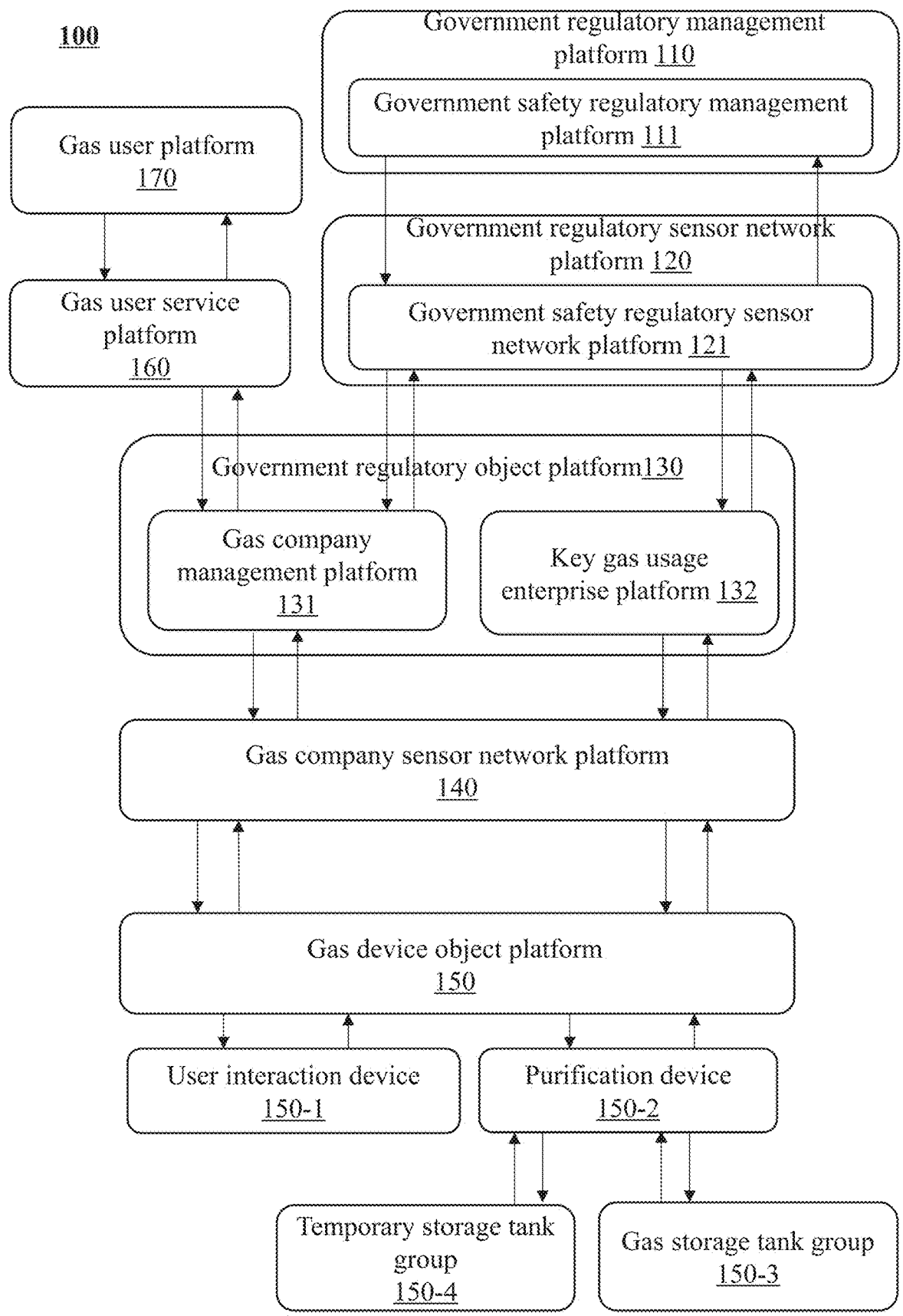
FIG. 1 is a schematic diagram illustrating a structure of a gas recovery system based on an intelligent gas regulatory IoT according to some embodiments of the present disclosure.

Before a pipeline is repaired, replaced, or operationally adjusted, the gas in the pipeline needs to be recovered to ensure safety and reduce waste. However, gas may be polluted in the pipeline. For example, dust and particles outside the pipeline may enter the interior of the pipeline, and moisture in the air may condense on the inner wall of the pipeline to form humidity, thus affecting the quality of the gas.

Therefore, it is desired to provide a gas recovery system and method based on an intelligent gas regulatory Internet of Things, which helps to detect and purify the gas to be recovered, and at the same time, to improve the safety of the recovery process and improve the economic efficiency.

SUMMARY

One or more embodiments of the present disclosure provide a gas recovery system based on an intelligent gas regulatory Internet of Things (IoT). The system includes a government regulatory management platform, a government regulatory sensor network platform, a government regulatory object platform, a gas company sensor network platform, and a gas device object platform, the government regulatory object platform including a gas company management platform. The government regulatory management platform, the government regulatory sensor network platform, and the government regulatory object platform may interact sequentially, and the gas company management platform, the gas company sensor network platform, and the gas device object platform may interact sequentially. The gas device object platform may include a purification device, a gas storage tank group, and a temporary storage tank group. The temporary storage tank group may include at least one temporary storage tank, and the temporary storage tank may be configured to store gas to be recovered. The purification device may be configured to extract the gas to be recovered from the temporary storage tank group, purify the gas to be recovered, and store purified gas in the gas storage tank group. The gas storage tank group may include at least one gas storage tank, and the gas storage tank may be configured to store the purified gas. The gas device object platform may include at least one user interaction device. The gas company management platform may be configured to obtain target detection data and target flow data of a pipeline to be recovered from the gas device object platform; determine, based on the target detection data and the target flow data, a gas pollution value; determine, based on the gas pollution value and the target flow data, a purification parameter of the purification device; determine a recovery instruction and send the recovery instruction to the at least one user interaction device via the gas device object platform, the recovery instruction instructing a staff member to store gas in the pipeline to be recovered in the temporary storage tank group; and in response to determining that a recovery completion instruction is obtained, send the purification parameter to the gas device object platform, and the gas device object platform is configured to generate a control instruction based on the purification parameter and send the control instruction to the purification device to control the purification device to operate according to the purification parameter.

One or more embodiments of the present disclosure provide a gas recovery method based on an intelligent gas regulatory IoT. The method may be realized based on an intelligent gas recovery IoT system. The intelligent gas recovery IoT system may include a government regulatory management platform, a government regulatory sensor network platform, a government regulatory object platform, a gas company sensor network platform, and a gas device object platform, and the gas device object platform may include at least one user interaction device. The method may include obtaining target detection data and target flow data of a pipeline to be recovered from the gas device object platform; determining, based on the target detection data and the target flow data, a gas pollution value; determining, based on the gas pollution value and the target flow data, a purification parameter of the purification device; determining a recovery instruction and sending the recovery instruction to the at least one user interaction device via the gas device object platform, the recovery instruction instructing a staff member to store gas in the pipeline to be recovered in a temporary storage tank group; and in response to determining that a recovery completion instruction is obtained, sending the purification parameter to the gas device object platform, where the gas device object platform is configured to generate a control instruction based on the purification parameter and send the control instruction to the purification device to control the purification device to operate according to the purification parameter.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Some embodiments of the present disclosure provide an intelligent gas recovery IoT system and a gas recovery method, which may be applied in a plurality of scenarios, such as gas management, environmental protection, resource recovery, etc. For example, in industrial production, especially in chemical and metallurgical industries, a large amount of impurity-containing gas is generated, and the intelligent gas recovery IoT system is integrated in the gas treatment systems of the enterprises, effectively recovering and purifying the gas in industrial production, and realizing the reuse of resources. As another example, when the gas pipeline needs to be maintained, repaired, or replaced, the intelligent gas recovery IoT system may recover and purify the gas in the pipeline to be recovered to ensure that the gas meets a re-emission standard.

FIG. 1 is a schematic diagram illustrating a structure of a gas recovery system based on an intelligent gas regulatory IoT according to some embodiments of the present disclosure.

As shown in FIG. 1, the gas recovery system 100 based on the intelligent gas regulatory IoT may include a government regulatory management platform 110, a government regulatory sensor network platform 120, a government regulatory object platform 130, a gas company sensor network platform 140, and a gas device object platform 150.

The government regulatory management platform 110 refers to a platform for the government to conduct regulatory management.

In some embodiments, the government regulatory management platform 110 may be configured as a single server or a group of servers. The group of servers may be centralized or distributed (e.g., servers may be part of distributed systems). In some embodiments, the server may be local or remote.

In some embodiments, the government regulatory management platform 110 may include a government safety regulatory management platform 111. The government safety regulatory management platform 111 refers to a platform for the government to conduct safety regulatory and management. For example, the government safety regulatory management platform 111 may receive information related to gas safety (e.g., gas safety event alarm data, gas device operation status data, gas pipeline network maintenance data) to conduct regulatory and management of gas safety. In some embodiments, the government safety regulatory management platform 111 may be configured as a processor, such as a combination of one or more of a microcontroller (MCU), an embedded processor, a graphics processing unit (GPU), or the like.

The government regulatory sensor network platform 120 refers to a platform for sensor communication of regulatory-related information and control of sensor communication information. For example, the government regulatory sensor network platform 120 may be configured as a communication base station, a router, a wireless device, or the like.

In some embodiments, the government regulatory sensor network platform 120 may include a government safety regulatory sensor network platform 121. The government safety regulatory sensor network platform 121 refers to a functional platform for managing safety regulatory-related information.

In some embodiments, the government regulatory sensor network platform 120 may interact with the government regulatory management platform 110 and the government regulatory object platform 130 for data exchange.

The government regulatory object platform 130 refers to a platform configured to provide data related to gas use, operations, and safety, and control information execution.

In some embodiments, the government regulatory object platform 130 may include a gas company management platform 131 and a key gas usage enterprise platform 132.

The gas company management platform 131 refers to a platform for managing gas-related data of a gas company.

In some embodiments, the gas company management platform 131 may interact with the gas company sensor network platform 140 and the government regulatory sensor network platform 120 for data exchange. For example, the gas company management platform 131 may obtain gas regulatory information of different gas regulatory regions, target detection data of a pipeline to be recovered, target flow data, or the like, based on the gas company sensor network platform 140. In some embodiments, the gas company management platform 131 may be configured on a gas company management server.

In some embodiments, the gas company management platform 131 may obtain target detection data and target flow data of the pipeline to be recovered from the gas device object platform. The target detection data includes an impurity detection time, an impurity type, and an impurity location, and the target flow data includes a pipeline area existing gas flows. The gas company management platform 131 may determine, based on the target detection data and the target flow data, a gas pollution value, determine, based on the gas pollution value and the target flow data, a purification parameter of the purification device, determine a recovery instruction and send the recovery instruction to at least one user interaction device via the gas device object platform, the recovery instruction instructing a staff member to store gas in the pipeline to be recovered in a temporary storage tank group, and, in response to determining that a recovery completion instruction is obtained, send the purification parameter to the gas device object platform. More descriptions regarding this section may be found in FIGS. 2-4 and related descriptions thereof.

The key gas usage enterprise platform 132 refers to a platform for key gas use enterprises to manage related information. For example, the government regulatory object platform 130 may obtain basic information of an enterprise through the key gas usage enterprise platform 132.

The gas company sensor network platform 140 refers to a platform for sensor communication of perceptual information and sensor communication of control information. For example, the gas company sensor network platform 140 may be configured as the communications base station, the router, the wireless device, or the like.

In some embodiments, the gas company sensor network platform 140 may interact with the gas company management platform 131, the key gas usage enterprise platform 132, and the gas device object platform 150 for data exchange.

The gas device object platform 150 refers to a functional platform for generating perceptual information and executing control information.

In some embodiments, the gas device object platform 150 includes at least one user interaction device 150-1. The user interaction device 150-1 is configured to interact with a user. In some embodiments, the user interaction device 150-1 may be configured to receive the recovery instruction to instruct the user to store the gas in the pipeline to be recovered in the temporary storage tank group based on the recovery instruction. In some embodiments, the user interaction device 150-1 may obtain input information from the user, or the like. In some embodiments, the user interaction device 150-1 may include input components and output components such as a button, a touch sensor, a joystick, a keypad, a microphone, a display, or the like. In some embodiments, the user may issue the recovery completion instruction via the user interaction device 150-1 to indicate that the user has stored the gas in the pipeline to be recovered in the temporary storage tank group.

In some embodiments, the gas device object platform 150 includes a purification device 150-2, a gas storage tank group 150-3, and a temporary storage tank group 150-4.

The temporary storage tank group 150-4 refers to a container for storing gas or fluid. For example, the temporary storage tank group 150-4 may be configured to temporarily store non-clean gas in the pipeline to be recovered. The non-clean gas refers to gas that has been contaminated during gas transmission and contains impurities and pollutants (e.g., adsorbing or carrying substances shed from an inner wall of the pipeline, such as rust, dust, etc.).

In some embodiments, the temporary storage tank group 150-4 includes one or more temporary storage tanks configured to store the gas to be recovered. The gas to be recovered refers to non-clean gas before purification.

When a gas pipeline needs to be maintained, repaired, or replaced, the non-clean gas in the pipeline may not be used or stored directly because the non-clean gas may contain substances that affect combustion efficiency or cause damage to the device. Therefore, the non-clean gas needs to be purified to remove impurities and pollutants to meet a prescribed gas quality standard and become clean gas.

The purification device 150-2 refers to a device configured to purify the non-clean gas. For example, the purification device may be a gas purification device, or the like. The purification device 150-2 may remove impurities and pollutants from the gas to be recovered by filtration, separation, and other treatments, thereby purifying and improving gas quality.

In some embodiments, the purification device 150-2 may include a pipeline regulating valve, a pressure control unit, a temperature control unit, or the like (not shown in the figures).

The pipeline regulating valve refers to a valve configured to control circulation or the flow of the gas in the purification device.

The pressure control unit refers to a device for regulating pressure inside the purification device. For example, the pressure control unit may control the pressuring or depressuring according to the purification parameter to regulate indoor pressure. Accordingly, the pressure control unit may include a compressor and a pressure relief valve.

The temperature control unit refers to a device for regulating temperature inside the purification device. For example, the temperature control unit may control the heating or cooling according to the purification parameter to regulate the temperature. Accordingly, the temperature control unit may include a heater and a cooler.

The gas storage tank group 150-3 refers to a container for storing gas or fluid. For example, the gas storage tank group 150-3 may be configured to store purified gas.

In some embodiments, the gas storage tank group 150-3 may include one or more gas storage tanks configured to store the purified gas.

In some embodiments, the purification device 150-2 may be communicatively connected to the gas device object platform 150, the gas device object platform 150 is communicatively connected to the gas company sensor network platform 140, the government regulatory object platform 130, the government regulatory sensor network platform 120, and the government regulatory management platform 110 in sequence. The gas device object platform 150 may receive the purification parameter issued by the government regulatory management platform, generate a corresponding control instruction based on the purification parameter, and send the control instruction to the purification device 150-2. The purification device 150-2 may extract the gas to be recovered from the temporary storage tank group, purify the gas to be recovered, and store the purified gas in the gas storage tank group based on the control instruction.

In some embodiments, the gas device object platform 150 may also include various types of gas pipeline network devices (e.g., an outdoor gas pipeline, a valve control device, a pressure regulating device, etc.) and monitoring devices (e.g., a temperature sensor, a pressure sensor, a gas detector, an inspection robot, etc.).

In some embodiments, the gas device object platform 150 may obtain the target detection data and the target flow data of the pipeline to be recovered, and upload the target detection data and the target flow data of the pipeline to be recovered to the government regulatory management platform 110 via the gas company sensor network platform 140, etc. More descriptions regarding the target detection data and the target flow data may be found in related descriptions of FIG. 2.

More descriptions regarding the above section may be found in FIG. 2 and related descriptions thereof.

In some embodiments of the present disclosure, based on the gas recovery system 100, the automated monitoring of facilities and devices inside the comprehensive pipeline corridor can be realized by coordinating and operating regularly under the unified management of the intelligent gas management platform.

In some embodiments, the platform in the gas recovery system 100 may be divided into an intelligent gas primary network and an intelligent gas secondary network. The intelligent gas primary network refers to a network in which a government user regulates the operation of the gas pipeline network, and the intelligent gas secondary network includes a network in which the gas pipeline network operates. In some embodiments, the same platform in the gas recovery system 100 may play different roles in the intelligent gas primary network and the intelligent gas secondary network.

In some embodiments, the intelligent gas primary network may include an intelligent gas primary network service platform, an intelligent gas primary network management platform, an intelligent gas primary network sensor network platform, and an intelligent gas primary network object platform. The intelligent gas primary network management platform may include the government regulatory management platform 110, the intelligent gas primary network sensor network platform may include the government regulatory sensor network platform 120, and the intelligent gas primary network object platform may include the government regulatory object platform 130.

In some embodiments, the intelligent gas secondary network may include an intelligent gas secondary network management platform, an intelligent gas secondary network sensor network platform, and an intelligent gas secondary network object platform. The intelligent gas secondary network management platform may include the gas company management platform 131, the intelligent gas secondary network sensor network platform may include the gas company sensor network platform 140, and the intelligent gas secondary network object platform may include the gas device object platform 150.

It should be noted that the foregoing description of the gas recovery system based on the intelligent gas regulatory IoT is for the purpose of exemplification and illustration only, and does not limit the scope of application of the present disclosure.

FIG. 2 is a flowchart illustrating an exemplary gas recovery method based on an intelligent gas regulatory IoT according to some embodiments of the present disclosure.

In some embodiments, process 200 may be performed based on the gas company management platform of the gas recovery system based on the intelligent gas regulatory IoT. As illustrated in FIG. 2, process 200 includes the following operations.

In 210, the target detection data and the target flow data of the pipeline to be recovered are obtained from the gas device object platform.

The pipeline to be recovered refers to a gas pipeline where the gas needs to be recovered. In some embodiments, a gas pipeline that needs to be repaired, replaced, or related to a management operation associated with operational adjustments may be determined as the pipeline to be recovered.

The target detection data refers to impurity detection data of the pipeline to be recovered in a preset time period. For example, the preset time period refers to a time period during which the monitoring device performs the most recent monitoring. The target detection data may include impurity detection data acquired by the pipeline to be recovered at the most recent monitoring.

The impurity detection data refers to information related to the impurities in the pipeline.

In some embodiments, the impurity detection data may include an impurity detection time, an impurity type, and impurity locations for different types of impurities.

The impurity detection time refers to a specific time point when the impurity is detected. The impurity type refers to a result of categorizing and identifying the impurities in the pipeline. For example, the impurity type may include types such as water vapor, dust particles, sulfides, or the like. The impurity location refers to a location in the pipeline where the impurity is located.

The target flow data refers to gas flow data of the pipeline to be recovered in the preset time period. For example, the target flow data may include the gas flow data obtained in the pipeline to be recovered at the most recent monitoring.

The gas flow data refers to information related to the flow of the gas in the pipeline.

In some embodiments, the gas flow data may include a region of the pipeline where the gas flow exists.

The region of the pipeline where the gas flow exists refers to a pipeline segment or a region where gas passes through in the pipeline to be recovered. When there is no pipeline segment or region in the pipeline to be recovered that has gas passing through, the gas flow data may be 0.

In some embodiments, the target detection data and the target flow data are monitored and collected by the monitoring device of the gas device object platform. For example, the monitoring device is distributed inside the pipeline to be recovered for monitoring and collecting the impurity detection data and the gas flow data inside the pipeline to be recovered.

In some embodiments, the gas company management platform may obtain the impurity detection data and the gas flow data collected by the monitoring device from the gas device object platform via the gas company sensor network platform. The gas company management platform may filter the target detection data and the target flow data from the collected impurity detection data and the gas flow data.

More descriptions about the gas device object platform, the gas company sensor network platform, the government regulatory object platform, the government regulatory sensor network platform, and the monitoring device may be found in FIG. 1 and related descriptions thereof.

In 220, the gas pollution value is determined based on the target detection data and the target flow data.

The gas pollution value is used to measure the degree to which the gas is polluted. The gas pollution value may be expressed as a numerical value, and the more seriously the gas is polluted, the greater the gas pollution value.

In some embodiments, the gas company management platform may determine the gas pollution value based on the target detection data, the target flow data in a plurality of ways. For example, the gas company management platform may construct a first retrieval vector based on the target detection data and the target flow data, search in a first database based on the first retrieval vector, determine a first target vector that meets a matching condition, and designate a reference gas pollution value corresponding to the first target vector as a current gas pollution value.

The first database refers to a database for storing, indexing, and querying vectors. The first database may store a plurality of first reference vectors and a reference gas pollution value corresponding to each first reference vector. The first reference vector is constructed from historical target detection data and historical target flow data.

The historical target detection data and the historical target flow data constructing the first reference vector may be data computed or acquired at the same time point or during the same time period.

In some embodiments, the gas company management platform may construct the first database based on historical data. For example, historical impurity detection data and historical gas flow data of each historical detection performed on a recovered pipeline, and a historical detected gas pollution value corresponding to each detection time period are constructed into a clustering vector; at least one cluster set is formed based on clustering the clustering vector; a first reference vector is constructed by the historical target detection data, the historical target flow data in the clustering vector corresponding to a center of the cluster set, and the historical detected gas pollution value corresponding to the center of the cluster set is stored in association with the first reference vector. Further, the gas company management platform may construct the first database based on the plurality of first reference vectors and reference gas pollution values corresponding to the plurality of first reference vectors.

Clustering algorithms may include a variety of types, for example, K-Means clustering, density-based clustering approach (DBSCAN), or the like.

A detected gas pollution value refers to a degree to which the gas is polluted as obtained by the actual detection of the gas to be recovered.

In some embodiments, at each historical detection performed on the recovered pipeline, the gas company management platform may detect the gas to be recovered before purification by the gas detector to determine the concentrations of various types of impurities, and determine the detected gas pollution value by weighted summation of the concentrations of the various types of impurities.

The matching condition refers to a judgment condition configured to determine a target vector. The matching condition may include a vector distance from the retrieved vector being less than a first threshold, the vector distance being minimized, or the like. There are a plurality of manners for calculating the vector distance, such as Euclidean distance, cosine distance, etc. The first threshold may be a system preset value, a system default value, etc.

In some embodiments, the gas company management platform may determine a current impurity distribution based on the target detection data, and determine the gas pollution value based on the current impurity distribution and the target flow data.

The current impurity distribution refers to the impurity detection data at the current moment. For example, the current impurity distribution may include the current moment, the impurity type, and the impurity locations of the different types of impurities.

The current moment refers to a moment when the calculation or evaluation of the purification parameter is performed. The current moment may be any time point, depending on the time when the gas company management platform processes the relevant instruction.

In some embodiments, the gas company management platform may filter based on the historical data to determine historical impurity detection data that is the same as or similar to the target detection data of the pipeline to be recovered, and determine the impurity type and the impurity location of the next impurity detection data of the historical impurity detection data as the impurity type and the impurity location of the current impurity distribution.

In some embodiments, the gas company management platform may determine the gas pollution value in a plurality of ways based on the current impurity distribution and the target flow data. For example, the gas company management platform may obtain an initial gas pollution value based on the target detection data and the target flow data, determine an adjustment factor based on the current impurity distribution, and increase the initial gas pollution value based on the adjustment factor. The initial gas pollution value may be the gas pollution value determined based on the target detection data and the target flow data through the first database.

For example, the gas company management platform may determine the adjustment factor based on the impurity type of the current impurity distribution. Different impurity types correspond to different adjustment factors. For example, water vapor has a smaller impact on the gas pollution value and thus has a smaller adjustment factor, while the dust particles or the sulfides have a larger impact on the gas pollution value and thus have a larger adjustment factor.

As another example, the gas company management platform may determine the adjustment factor based on the impurity location of the current impurity distribution. For example, when the impurity location is near an inlet of the pipeline, the adjustment factor is larger, indicating that the impurity is more likely to affect the gas quality.

In some embodiments, the gas company management platform may construct the retrieval vector based on the current impurity distribution and the target flow data and perform a vector match based on the retrieval vector in the first database to determine the current gas pollution value. More descriptions of the vector match may be found in the foregoing related descriptions.

In some embodiments, the gas pollution value is also related to line data and gas inspection data on at least one gas line where the pipeline to be recovered is located. More descriptions of this embodiment may be found in FIG. 3 and related descriptions thereof.

There may be a difference between the target detection data obtained from the most recent detection and the current impurity distribution obtained at the current moment. If a time interval between the most recent detection and the current moment is small, the target detection data can reflect the impurity situation in the current pipeline. If the time interval between the most recent detection and the current moment is large, the target detection data cannot reflect the impurity situation in the current pipeline. In some embodiments of the present disclosure, the current impurity distribution is predicted by the target detection data, and then the gas pollution value is determined based on the current impurity distribution, so that the determined gas pollution value is more closely matched to the current situation, improving the accuracy of the determined gas pollution value.

In 230, the purification parameter of the purification device is determined based on the gas pollution value and the target flow data.

The purification parameter refers to a series of parameters configured to control the operation of the purification device. For example, the purification parameter may include parameters such as a gas flow rate, an internal pressure, an internal temperature, a concentration of a scrubbing fluid, etc.

The gas flow rate is used to characterize the gas flow rate into the purification device. The internal pressure is used to reflect the pressure value within the purification device. The internal temperature is used to reflect the temperature value within the purification device. The concentration of the scrubbing solution refers to the concentration of the active ingredient or solute in the scrubbing solution used during the purification process. The scrubbing solution may include an alkaline scrubbing solution, an acidic scrubbing solution, or the like.

In some embodiments, the gas company management platform may determine the purification parameter based on the gas pollution value and the target flow data in a plurality of ways. For example, the gas company management platform may construct a preset table based on the historical data of a historical purification process and determine the corresponding purification parameter by table lookup. The preset table is configured to reflect a correspondence between different combinations of the gas pollution value and historical gas flow data with different purification parameters.

In some embodiments, the control module may count the purification parameter that has been employed the most times in actual purification under different combinations of the gas pollution value and the historical gas flow data from the historical data of a plurality of historical purification processes as the purification parameter corresponding to the combination of the gas pollution value and the historical gas flow data.

In some embodiments, the gas company management platform may obtain at least one candidate purification parameter and determine the purification parameter from the at least one candidate purification parameter. More descriptions of this embodiment may be found in FIG. 4 and related descriptions thereof.

In 240, a recovery instruction is determined and sent to at least one user interaction device via the gas device object platform.

The recovery instruction refers to an instruction that instructs a relevant staff member of the gas company to perform a recovery operation. The recovery operation may include recovering the pipeline to be recovered and storing the gas to be recovered inside the pipeline to be recovered to the temporary storage tank group, etc. In some embodiments, the recovery instruction is used to instruct the staff member to store the gas in the pipeline to be recovered in the temporary storage tank group.

In some embodiments, the gas company management platform may send the recovery instruction to the government regulatory object platform via the government regulatory sensor network platform while determining the purification parameter or after a specified time. The government regulatory object platform may send the recovery instruction to the gas device object platform via the gas company sensor network platform. The gas device object platform may send the recovery instruction to at least one user interaction device. The user interaction device may issue an instruction to the user based on the recovery instruction.

In some embodiments, the recovery instruction may be displayed for directly output at an interaction interface of the user interaction device. In some embodiments, the recovery instruction may be sent to the staff member via a text message. For example, the recovery instruction is sent to a cell phone of the staff member via the text message. As another example, the recovery instruction is sent to the user interaction device via a prompt message. In some embodiments, the recovery instruction may be delivered to a specific interface of the user interaction device, the interface including, but not limited to, a program interface, a data interface, a transmission interface, etc.

In some embodiments, the staff member (e.g., a gas operation and maintenance staff member) may input the recovery completion instruction after storing the gas in the pipeline to be recovered in the temporary storage tank group via the user interaction device. For example, the user completes the instruction by pressing a keyboard key, tapping on a touchscreen, or sending a related voice message to cause the user interaction device to receive the recovery completion instruction.

In 250, in response to determining that the recovery completion instruction is obtained, the purification parameter is sent to the gas device object platform.

The recovery completion instruction refers to a signal or instruction acknowledged and sent by the staff member to indicate that the staff member has completed the associated recovery operation.

In some embodiments, the user interaction device may send the interaction completion instruction to the gas company management platform via the gas device object platform and the gas company sensor network platform in turn after receiving the interaction completion instruction from the staff member.

In some embodiments, the gas company management platform may, in response to determining that the recovery completion instruction is obtained, send the purification parameter to the gas device object platform via the gas company sensor network platform, the gas company management platform, and the government regulatory sensor network platform in turn. The gas device object platform may generate and send a corresponding control instruction to the purification device based on the purification parameter to control the pipeline regulating valves, the pressure control unit, the temperature control unit, or the like, of the purification device to operate with the purification parameter. For example, the purification device may extract the gas from the temporary storage tank group based on the purification parameter, purify the gas to be recovered, and store the purified gas in the gas storage tank group.

In some embodiments of the present disclosure, when the pipeline is repaired, replaced, or operationally adjusted, it is necessary to first recover the gas in the pipeline, and the gas may be polluted by transmission through the pipeline and may not be recovered directly. Through the gas pollution value, the condition of the gas passing through the pipeline is measured, and then the purification parameter is determined, so as to ensure that the gas is recovered safely, and at the same time to reduce the wastage of gas resources.

It should be noted that the foregoing description of the process is for the purpose of exemplification and illustration only, and does not limit the scope of application of the present disclosure. For a person skilled in the art, various corrections and changes may be made to the process under the guidance of the present disclosure. However, these corrections and changes remain within the scope of the present disclosure.

Figure 3:
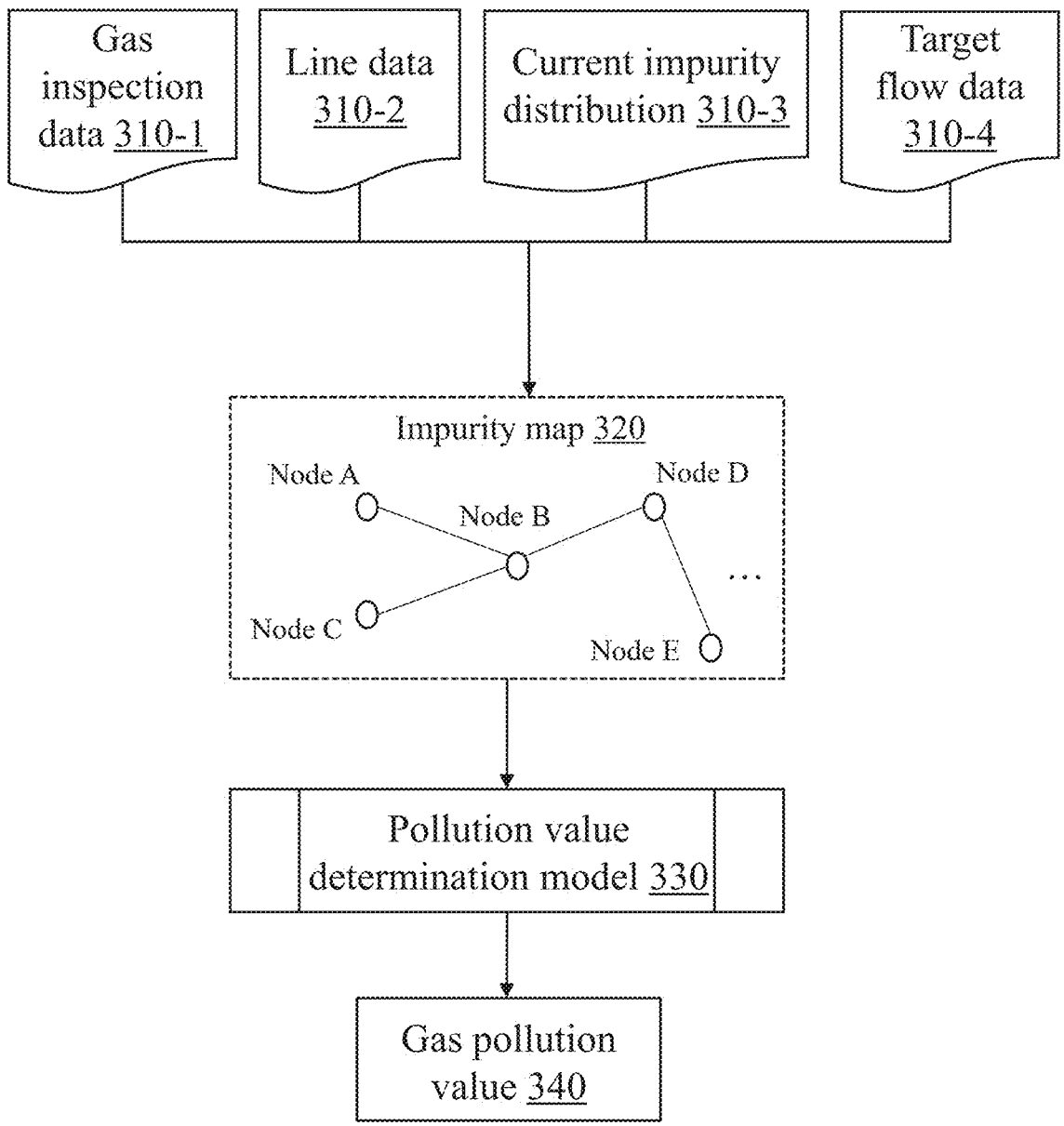
FIG. 3 is a schematic diagram illustrating a pollution value determination model according to some embodiments of the present disclosure.

FIG. 3 is a schematic diagram illustrating a pollution value determination model according to some embodiments of the present disclosure.

In some embodiments, the gas device object platform further includes at least one sampling device. The at least one sampling device is located at at least one preset location of the pipeline to be recovered, and the sampling device is configured to extract a preset amount of pipeline gas for inspection to obtain the gas inspection data.

The sampling device refers to a device configured to extract gas from the pipeline for automatic inspection. For example, the sampling device may be a pipeline sampling device, an online monitoring device, or the like.

In some embodiments, the pipeline to be recovered is arranged with one or more preset locations, each preset location may be installed with one or more sampling devices.

The preset location refers to a specific location in the pipeline pre-selected for placing the sampling device.

In some embodiments, the preset location may be an inlet, an outlet of the pipeline, or an intersection with another pipeline. In some embodiments, the preset location may be determined by the gas company management platform. For example, the pipeline location that has a plurality of historical anomalies (e.g., parts prone to impurity buildup or with high impurity content) may be determined as the preset location. As another example, the pipeline located in a high incidence region may be determined as the preset location. The high incidence region refers to a region of the pipeline that has historically been detected with the plurality of anomalies, which may be determined based on historical statistics.

In some embodiments, the sampling device may be configured to extract the preset amount of the pipeline gas for inspection to obtain the gas inspection data. The preset amount may be determined based on an experiment or experience.

The gas inspection data refers to data obtained after the inspection of the preset amount of the extracted gas to be recovered. For example, the gas inspection data may include a gas concentration, a gas composition, or the like.

The gas concentration refers to a proportion of the gas in a mixed gas. The gas composition refers to a proportion of various gas components in the gas, including but not limited to hydrocarbon gases such as methane, ethane, propane, butane, and non-hydrocarbon gases such as carbon dioxide and nitrogen.

In some embodiments, the gas pollution value is also correlated to the line data and the gas inspection data on the at least one gas line where the pipeline to be recovered is located. As shown in FIG. 3, the gas company management platform is further configured to construct an impurity map 320 based on a gas inspection data 310-1 at the at least one preset location, line data 310-2 on the at least one gas line, a current impurity distribution 310-3, and target flow data 310-4 and determine a gas pollution value 340 by processing the impurity map through a pollution value determination model 330.

More description about the current impurity distribution and the target flow data may be found in FIG. 2 and related descriptions thereof.

The gas line refers to a gas transmission line that is connected or associated with the pipeline to be recovered.

In some embodiments, the pipeline to be recovered may be connected to the at least one pipeline to form the at least one gas line, and the gas line may be composed of a plurality of the pipelines, all of which include the pipeline to be recovered.

The line data refers to information related to all pipelines on the gas line where the pipeline to be recovered is located.

In some embodiments, the line data may include at least one of a pipeline temperature, a pipeline air pressure, and the impurity detection data of all pipelines on the gas line where the pipeline to be recovered is located.

The corresponding line data is different as the gas lines are different.

In some embodiments, the monitoring device may be provided on the at least one pipeline of the at least one gas line to obtain the corresponding line data. The pipeline composed of the gas line may be a straight pipeline segment that does not include any branching points or include a plurality of connected pipeline segments.

In some embodiments, the gas company management platform may obtain the gas inspection data and the line data collected by the sampling device and the monitoring device from the gas device object platform via the government regulatory sensor network platform, the gas company management platform, and the gas company sensor network platform in turn.

More descriptions of the gas device object platform and the gas company sensor network platform may be found in FIG. 1 and related descriptions thereof.

The impurity map may be configured to characterize a mapping of each pipeline and a relationship between each pipeline.

In some embodiments, the impurity map may be a data structure formed by nodes and edges, with the edges connecting the nodes, and the nodes and the edges may include attributes. As shown in FIG. 3, the nodes of the impurity map 320 may include A, B, C, D, and E, and the edges may include AB, BC, BD, and DE.

The nodes correspond to the pipelines on each gas line.

The nodes may include a node to be recovered and other nodes. The node to be recovered corresponds to the pipeline to be recovered, and the other nodes correspond to pipelines other than the pipeline to be recovered on the at least one gas line.

The attribute of the node to be recovered may reflect information related to the node to be recovered. For example, the attribute of the node to be recovered may include the target detection data, whether the gas flows through the pipeline, the gas inspection data, and the pipeline length. The attributes of the other nodes may reflect information related to other pipelines. The attributes of other nodes may include the line data, whether the gas flows through the pipeline, the pipeline length, or the like.

Whether the gas flows through the pipeline refers to whether the gas actually passes through the pipeline during gas delivery.

In some embodiments, the result of whether the gas flows through the pipeline may be represented by 0 or 1. For example, when the gas flows through the pipeline, it is indicated by 1; when no gas flows through the pipeline, it is indicated by 0.

In some embodiments, the gas company management platform may determine whether the gas flows through the pipeline in a plurality of ways. For example, when the pipeline is the pipeline to be recovered, the gas company management platform may determine whether the gas flows through the pipeline based on the target flow data. As another example, when pipelines are other pipelines, the gas company management platform may determine whether the gas flows through the pipeline by devices such as a flow meter or a pressure gauge in the corresponding pipeline.

In some embodiments, the attribute of the nodes of the impurity map also includes a pipeline in-degree.

The pipeline in-degree indicates a count of pipeline branches of gas flowing into the node.

In some embodiments, the gas company management platform may determine the pipeline in-degree of each node based on a gas pipeline network map.

The gas pipeline network map refers to a map used to show the structure of the gas pipeline network, the connection between pipelines, and attribute information of the pipelines.

The gas pipeline network map may be pre-drawn by an urban planning department, a gas company, or a professional surveying and mapping organization, and stored in a storage device of the gas company management platform. In some embodiments, the gas company management platform may obtain the gas pipeline network map based on the storage device of the gas company management platform.

The pipeline in-degree may provide information about the complexity of the gas network. Nodes with a higher pipeline in-degree typically represent more upstream pipeline connections and are more likely to be polluted. In some embodiments of the present disclosure, determining the pipeline in-degree as the attribute of the node helps to improve the accuracy of a predicted gas pollution value when subsequently predicting the gas pollution value based on the impurity map.

The edge between two nodes indicates that two nodes correspond to pipelines that are directly connected. The attribute of the edge includes an upstream and downstream relationship between the pipelines.

The upstream and downstream relationship between the pipelines refers to a pipeline connection relationship formed according to the direction of gas flow. An upstream pipeline refers to a pipeline through which the gas flows first, while a downstream pipeline refers to a subsequent pipeline through which the gas flows.

The attributes of the nodes and edges may be determined by various manners based on input data. The manners are those illustrated in the above embodiments or may be other manners. The input data may include the current impurity distribution, the target flow data, the gas inspection data, the line data, or the like, or may include a historical impurity distribution, historical flow data, historical gas inspection data, historical line data, or the like.

In some embodiments, the attribute of the edges of the impurity map further includes a pollution strength value.

The pollution strength value is used to characterize the pollution capacity of the impurity within the pipeline.

In some embodiments, the pollution strength value is related to the impurity type. Different impurity types have different pollution capacities for the gas in the pipeline, and the correspondence may be obtained based on an experiment or experience. For example, the same volume of the gas may be taken as a test sample, different types of impurities may be added to a plurality of test samples, time for different types of impurities added to the test samples until the test samples reach a "complete pollution" state may be recorded, and the correspondence is established between the impurity type and a ratio of the time and volume corresponding to the "completely pollution" state.

In some embodiments, the gas company management platform may conduct a real-time detection by the gas detector to determine the impurity content in the test sample, and determine that the impurity content reaches the "complete pollution" state when the impurity content exceeds a content threshold. The content threshold may be determined based on testing or experience.

It should be noted that the consistency of the test samples needs to be maintained during testing, e.g., all test samples are from the same batch of gas, having the same initial condition (e.g., the concentration, the temperature, the pressure, etc.), and having the same rate of adding impurities.

In some embodiments of the present disclosure, the pollution strength value of the pipeline impurity measures the pollution capacity of the impurity, and by relating the pollution strength value of the pipeline impurity, it is possible to further characterize the pollution at the different pipelines.

In some embodiments of the present disclosure, the layout and structure of the pipeline system may be more intuitively represented by representing a connection relationship between the pipelines based on a map structure. The attributes of the nodes and the edges of the impurity map provide a wealthy information, which helps to perform in-depth data analysis, such as identifying the pipeline to be recovered, assessing the pollution status of the pipelines, or the like.

The pollution value determination model refers to a model for determining the gas pollution value. In some embodiments, the pollution value determination model may be a machine learning model. For example, the pollution value determination model may be a neural network model. As another example, the pollution value determination model may be a graph neural network (GNN) model.

In some embodiments, an input of the pollution value determination model may include the impurity map, and an output of the pollution value determination model is the gas pollution value. The node to be recovered in the impurity map may be output with a corresponding gas pollution value.

In some embodiments, the pollution value determination model may be trained in various feasible ways based on a plurality of first training samples with first labels. For example, parameter updating may be performed based on a gradient descent algorithm. An exemplary training process includes obtaining a plurality of first training samples with first labels, inputting the plurality of first training samples with the first labels into an initial pollution value determination model, constructing a loss function based on the labels and results of the initial pollution value determination model, and iteratively updating parameters of the initial pollution value determination model based on the loss function by the gradient descent algorithm, etc. The model training is completed when a preset condition is satisfied, and a trained pollution value determination model is obtained. The preset condition may be that the loss function converges, a count of iterations reaches a threshold, etc.

In some embodiments, the first training samples may include a sample impurity map, and the first labels may be a detected gas pollution value outputted by a sample node to be recovered. The nodes of the sample impurity map and a node characteristic, and the edges and an edge characteristic, are similar to foregoing descriptions. The first training sample may be determined based on historical data, and the first label may be determined by the gas company management platform or human labeling. The training of the pollution value determination model is similar to the training process of the effect determination model, which may be found in FIG. 4 and related descriptions thereof.

More descriptions of the measured gas pollution value may be found in FIG. 2 and related descriptions thereof.

In some embodiments of the present disclosure, by the pollution value determination model in the process of calculating the gas pollution value, the impurity map may be analyzed efficiently and accurately, which helps to improve the accuracy of the gas pollution value, and at the same time helps to improve the accuracy of the subsequently determined purification parameter.

Figure 4:
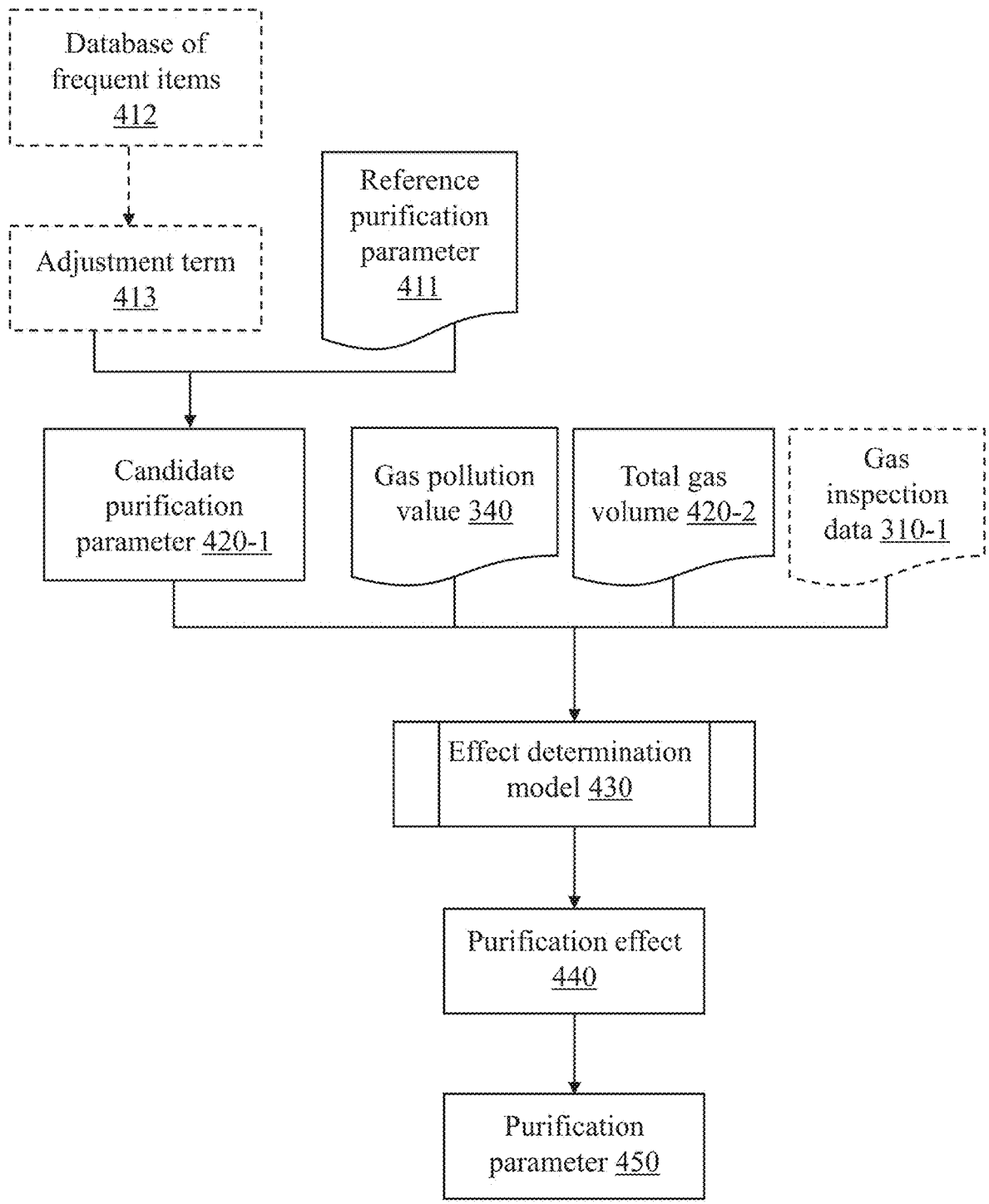
FIG. 4 is a schematic diagram illustrating an effect determination model according to some embodiments of the present disclosure.

FIG. 4 is a schematic diagram illustrating an effect determination model according to some embodiments of the present disclosure.

In some embodiments, as shown in FIG. 4, a purification parameter 450 is further related to a total gas volume 420-2 within the gas storage tank group. The gas company management platform may obtain a reference purification parameter 411, determine at least one candidate purification parameter 420-1 based on the reference purification parameter 411, determine, for each candidate purification parameter of the at least one candidate purification parameter, a purification effect 440 based on the gas pollution value 340, the total gas volume 420-2, and the candidate purification parameter 420-1, and determine the purification parameter 450 based on the purification effect 440 of the at least one candidate purification parameter.

More description of the gas pollution value and the purification parameter may be found in FIG. 2 and related descriptions thereof.

The total gas volume refers to a total volume or mass of the gas stored in the temporary storage tank group.

In some embodiments, the gas company management platform may determine the volume of the gas stored in each temporary storage tank by the flow meter or other measuring device and determine the total gas volume in the temporary storage tank group by summing volumes of the gas stored in all of the temporary storage tanks.

The reference purification parameter refers to a pre-set parameter that may be used to control the operation of the purification device.

In some embodiments, the gas company management platform may obtain the reference purification parameter based on the storage device or manual input.

The candidate purification parameter refers to a series of parameters to be determined as the purification parameter.

In some embodiments, the gas company management platform may determine the at least one candidate purification parameter based on the reference purification parameter in a plurality of ways. For example, for each reference purification parameter, the gas company management platform may select one or more parameters from the reference purification parameter to perform a data offset to obtain the at least one candidate purification parameter.

The data offset refers to an adjustment of one or more of the parameters based on a preset value and a given reference purification parameter. For example, the corresponding parameter in the reference purification parameter is obtained by adding or subtracting the preset value to each of the one or more parameters.

In some embodiments, as shown in FIG. 4, the gas company management platform may construct a database of frequent items 412, determine at least one adjustment term 413 based on the database of frequent items 412, and determine the at least one candidate purification parameter 420-1 based on the at least one adjustment term 413 and the reference purification parameter 411.

The database of frequent items refers to a database for storing frequent items and supports corresponding to the frequent items, and the frequent items are a combination of parameter items whose support meets a preset requirement.

The combination of parameter items may include a parameter item or a collection composed of a plurality of parameter items. For example, the combination of parameter items may include three kinds of parameter items, A, B, and C, where A, B, and C may correspond to one parameter item respectively.

The support refers to a frequency with which a parameter item or a combination of parameter items occurs in a data set.

The preset requirement refers to a judgment condition for determining the frequent items. For example, the preset requirement may be that the support is greater than a support threshold. The support threshold may be a system default value or a system preset value.

In some embodiments, the support threshold is related to a historical purification effect.

The historical purification effect is used to measure the purification effect corresponding to a historical purification parameter.

More description about the purification effect may be found in FIG. 4 and related descriptions thereof.

In some embodiments, the gas company management platform may determine a corresponding historical purification effect based on each historical purification parameter, and determine a corresponding statistical value based on each historical purification effect, for example, the statistical value may be a variance. The gas company management platform may determine the support threshold based on the statistical value corresponding to each historical purification effect by a preset rule. For example, the preset rule is that the larger the variance, the lower the support threshold.

In some embodiments of the present disclosure, dynamically adjusting the support threshold by considering a degree of variation of the historical purification effect may enable the system to determine the candidate purification parameter more flexibly and accurately. When the variance is large, it means that the historical purification effect fluctuates greatly, and lowering the support threshold may avoid erroneous exclusion of a valid purification parameter due to fluctuations. When the variance is small, it means that the historical purification effect fluctuates little, and raising the support threshold may obtain a more accurate purification parameter.

The parameter item is one of the parameters composing the purification parameter. For example, the parameter item may be one of the gas flow rate, the internal pressure, the internal temperature, or the concentration of the scrubbing fluid.

In some embodiments, the gas company management platform may determine the database of frequent items in a plurality ways. For example, the gas company management platform may determine the database of frequent items based on a frequent item algorithm.

Merely by way of example, the frequent item algorithm includes randomly selecting a combination of parameter items as a combination of target parameter items from a test database, matching the combination of target parameter items with a combination of parameter items in the test database based on a character matching algorithm to obtain a combination of matching parameter items, determining a count of the combination of matching parameter items as the support of the combination of target parameter items. The matching requirement may be related to a preset item count ratio. For example, the matching requirement may be that at least two parameter items in two combinations of parameter items are identical. The preset item count ratio may be a system default value, a system preset value, etc.

The test database may be pre-constructed based on the historical data. For example, the gas company management platform may count the historical data and combine one or more parameters in the purification parameter of the historical purification process different from the reference purification parameter as the combination of parameter items.

The above operations are repeated to determine the support corresponding to each combination of parameter items in the test database. The combination of parameter items with a support greater than the support threshold is determined as the frequent item, thereby constructing the database of frequent items based on the frequent items and the corresponding support.

For example, the gas company management platform matches a combination of parameter items 1 (including parameter items A, B, C, and D) with a combination of parameter items 2 (including parameter items A, B, and E), and a combination of parameter items 3 (including parameter items B, E, and G). Since the combination of parameter items 1 and the combination of parameter items 2 both contain the parameter items A and B and satisfy the preset item count ratio (e.g., there are at least two parameter item matches), and the combination of parameter items 1 and the combination of parameter items 3 both contain the parameter item B but do not satisfy the preset item count ratio, at this time, only the combination of parameter items 2 and the combination of parameter items 1 satisfy the matching requirement, then the support of the combination of parameter items 1 is 1. The above operation is repeated to get a support of 2 for the combination of parameter items 2 and a support of 1 for the combination of parameter items 3.

In some embodiments, determining whether two combinations of parameter items satisfy the matching requirement may be realized based on, for example, the character matching algorithm, etc. The character matching algorithm refers to an algorithm that calculates a matching degree of two strings of characters. In some embodiments, the character matching algorithm may be a KMP algorithm or a BM algorithm, and two strings of characters are determined to satisfy the matching requirement when the matching degree of the two strings of characters satisfies the preset item count ratio.

The adjustment term refers to a parameter item that needs to be adjusted. For example, the adjustment term may be one of the gas flow rate, the internal pressure, the internal temperature, the concentration of the washing liquid, or any combination thereof.

In some embodiments, the gas company management platform may determine a parameter, or a combination of parameters, selected from the database of frequent items as the adjustment term.

In some embodiments, the gas company management platform may arrange the frequent items in the database of frequent items in descending order of the support, i.e., the frequent item with a higher support is ranked higher. A preset count of the frequent items with a higher ranking are selected as the adjustment term. The preset count may be determined by an experiment or experience.

In some embodiments, the gas company management platform may adjust a corresponding parameter in the reference purification parameter based on the adjustment term to obtain the at least one candidate purification parameter. For example, the candidate purification parameter is determined by replacing the corresponding parameter in the reference purification parameter with each parameter in the adjustment term, respectively.

In some embodiments of the present disclosure, constructing the database of frequent items and determining the adjustment term to adjust the reference purification parameter, thereby generating the candidate purification parameter helps to optimize the purification process based on the historical data and experience, and ensures the reliability and the accuracy of subsequent purification.

The purification effect refers to a parameter that measures the effective effect of purifying the non-clean gas. The purification effect may be in the form of a numerical value, a rating, and many other forms.

In some embodiments, for each of the at least one candidate purification parameter, the gas company management platform may determine the purification effect based on the gas pollution value, the total gas volume, and the candidate purification parameter in a variety of ways. For example, the gas company management platform may construct a second retrieval vector based on the gas pollution value, the total gas volume, and the candidate purification parameter, search in a second database based on the second retrieval vector, determine a first target vector that meets the matching condition, and determine a reference purification effect corresponding to the first target vector as a current purification effect.

The second database refers to a database for storing, indexing, and querying vectors. The second database may store a plurality of second reference vectors and a reference purification effect corresponding to each second reference vector. The second reference vectors are constructed from a historical gas pollution value, a historical total gas volume, and a historical purification parameter.

The historical gas pollution value, the historical total gas volume, and the historical purification parameter composed of the second reference vector may be data calculated or obtained at the same time point or time period.

In some embodiments, the gas company management platform may construct the second database based on the historical data. For example, the historical gas pollution value, the history total gas volume, the historical purification parameter, and the reference purification effect of the historical data are constructed into the clustering vector. At least one cluster set is formed based on clustering the clustering vector. The historical gas pollution value, the historical total gas volume, and the historical purification parameter in the clustering vector corresponding to the center of the clustering set are constructed into the second reference vector, and the reference purification effect corresponding to the center of the clustering set is associated with the second reference vector. Further, the gas company management platform may construct the second database based on the plurality of second reference vectors and corresponding reference purification effects.

More description about matching and clustering may be found in FIG. 2 and related descriptions thereof.

In some embodiments, the gas company management platform may obtain the reference purification effect in a plurality of ways. For example, the gas company management platform may detect clean gas based on the historical purification parameter to obtain a gas pollution value after purification, calculate a difference between a gas pollution value before purification and the gas pollution value after purification, and determine a ratio of the difference to the gas pollution value before purification as the reference purification effect.

In some embodiments, as shown in FIG. 4, the gas company management platform may determine the purification effect 440 of the candidate purification parameter based on the gas pollution value 340, a total gas volume 420-2, and a candidate purification parameter 420-1 through an effect determination model 430.

The effect determination model refers to a model used to determine the purification effect of the candidate purification parameter.

In some embodiments, the effect determination model is a machine learning model, e.g., the effect determination model may include a convolutional neural network (CNN) model, a neural network (NN) model, or other customized model structure, etc., or any combination thereof.

In some embodiments, inputs of the effect determination model include the gas pollution value, the total gas volume, and the candidate purification parameter, and an output may include the purification effect of the candidate purification parameter. One candidate purification parameter may be input to the effect determination model, the output of the effect determination model at this time is the purification effect of the candidate purification parameter. A plurality of candidate purification parameters may be input into the effect determination model, and the output of the effect determination model at this time is the purification effect of each of the plurality of candidate purification parameters.

In some embodiments, the inputs of the effect determination model 430 further include at least one gas inspection data 310-1, as shown in FIG. 4. More description of the gas inspection data may be found in FIG. 2 and related descriptions thereof.

In some embodiments of the present disclosure, the accuracy of predicting the purification effect and the generalization ability of the model may be further improved by adding the gas inspection data as an input, thereby optimizing the purification process, improving a resource utilization rate, and ensuring safety and effectiveness of the purification process.

In some embodiments, the effect determination model may be trained in various feasible ways based on a plurality of second training samples with second labels. For example, parameter updating may be performed based on the gradient descent algorithm. An exemplary training process includes obtaining a plurality of second training samples with second labels, inputting the plurality of second training samples with the second labels into an initial effect determination model, constructing a loss function by the second labels and results of the initial effect determination model, iteratively updating parameters of the initial effect determination model by the gradient descent algorithm or other algorithms based on the loss function. The training of the model is completed when a preset condition is satisfied, and a trained effect determination model is obtained. The preset condition may be that the loss function converges, the count of iterations reaches the threshold, etc.

In some embodiments, the second training samples include at least a sample gas pollution value of a sample pipeline, a sample total gas volume, and a sample purification parameter. In some embodiments, when the inputs of the effect determination model include a plurality of pieces of the gas inspection data, the second training sample may also include a plurality of pieces of sample gas inspection data. The second training samples may be obtained based on the historical data.

In some embodiments, the second labels may include the reference purification effect corresponding to the sample purification parameter. The second labels may be obtained through the gas company management platform or manual labeling. For example, under an environmental condition corresponding to a second training sample, the clean gas is obtained by using the sample purification parameter to purify the gas to be purified, the clean gas is detected to obtain the gas pollution value after purification, and a difference between the gas pollution value before purification and the gas pollution value after purification is calculated, and a ratio of the difference to the gas pollution value before purification is determined as the reference purification effect and as a second label.

In some embodiments of the present disclosure, the purification effect corresponding to the candidate purification parameter may be efficiently and accurately predicted by the effect determination model, thereby obtaining better results than the empirical-based direct determination, which helps to subsequently determine the most suitable purification parameter.

In some embodiments, the effect determination model has different learning rates for different second training samples during training, with a learning rate for each second training sample being related to the sample total gas volume in the second training sample. In some embodiments, the learning rate of each second training sample is positively related to the sample total gas volume in the second training sample, i.e., the greater the sample total gas volume in the second training sample, the greater the learning rate.

The learning rate refers to a parameter used to control the magnitude of weight updates in a machine learning algorithm. In some embodiments, the learning rate is a configurable parameter used in the training of the neural network, and the value of the learning rate is typically a small positive value, for example, the learning rate is in a range between 0.0 and 1.0. The weight refers to a parameter used in a neural network model to compute and estimate a relationship between an input sample and an output sample.

In some embodiments, the gas company management platform may determine an initial learning rate for the initial effect determination model, and the learning rate may be dynamically adjusted as the training proceeds, e.g., by using a manner such as a learning rate decay or an adaptive learning rate to adapt to learning needs of the model at different stages.

In some embodiments of the present disclosure, by adjusting the learning rate according to the sample total gas volume of the second training sample, the effect determination model may be more flexible and efficient during the training process. For example, for the samples with a large sample total gas volume, the learning rate may be appropriately increased to accelerate the training speed; for samples with a small sample total gas volume, the learning rate may be appropriately reduced to ensure that the effect determination model may fully learn.

In some embodiments, training data of the effect determination model includes a plurality of sample sets, each sample set of the plurality of sample sets includes a plurality of training samples (i.e., the second training samples) with labels (i.e., the second labels).

In some embodiments, the plurality of sample sets includes a training set, a validation set, and a test set.

The training set refers to a dataset used to adjust the learning parameter of the model during model training. The learning parameter includes parameters such as weights, biases, or the like.

The validation set refers to a dataset used to adjust a hyperparameter of the model during the model training. The hyperparameter includes a count of network layers, a count of network nodes, a count of iterations, the learning rate, or the like.

The test set refers to a dataset used to evaluate the performance of a final model.

In some embodiments, a count of the training samples in the training set, a count of the training samples in the validation set, and a count of the training samples in the test set reaches a preset quantity proportion. The preset quantity proportion may be set in advance, e.g., 8:1:1, etc. In some embodiments, there is no data intersection between a plurality of second training samples in the training set, a plurality of second training samples in the test set, and a plurality of second training samples in the validation set. No data intersection means that the same piece of data (i.e., the second training sample) may only be present in one of the training set, the test set, and the validation set.

In some embodiments, a sample statistical difference of the training set is greater than a preset difference threshold. The sample statistical difference reflects a sample diversity of the training set, and the greater the sample diversity, the greater the sample statistical difference.

In some embodiments, the gas company management platform may construct the feature vector by quantifying the historical gas pollution value, the historical total gas volume, and the historical purification parameter in each of the second training samples in the training set as a number, calculate a vector distance between every two feature vectors of the training set, such as a cosine distance, etc., calculate a statistical value of a plurality of the vector distance, such as the variance, etc., and finally determine the sample statistical difference of the training set according to the statistical value. For example, the larger the variance, the larger the sample statistical difference.

The preset difference threshold refers to a threshold used to limit the range of the sample statistical difference. In some embodiments, the preset difference threshold may be set in advance based on historical data or prior knowledge.

In some embodiments, the preset difference threshold is related to the statistical value of the historical purification effect. The statistical value may be the variance and a ratio of an average to the variance, and the greater the statistical value of the historical purification effect, the greater the preset difference threshold. The historical purification effect includes the purification effects after a plurality of purification treatments of the pipeline in history.

In some embodiments of the present disclosure, by determining the sample statistical difference, the model may be more robust to prevent the model from overfitting. The greater the variance of the historical purification effect, the more uncertain the quality of the historical purification parameter and the more potential impacts of the various aspects involved, thus the preset difference threshold may be increased to allow the effect determination model to learn from a more widely distributed data samples to more accurately learn predictions about a target. The stability and accuracy of the effect determination model may be improved through the first training process.

In some embodiments, the gas company management platform may perform at least one round of iterative training on the effect determination model based on the training set. With the at least one round of iterative training, the learning parameter of the effect determination model may be updated.

In some embodiments, the gas company management platform may validate the effect determination model trained in a first stage based on the validation set and adjust the hyperparameter of the effect determination model based on a validation result.

In some embodiments, the gas company management platform may test the effect determination model with a determined learning parameter and hyperparameter based on the test set to assess the generalization capability of the effect determination model.

The embodiments of the present disclosure do not have any special limitation on the way to train the model using the training set, the test set, and the validation set, and it is sufficient to adopt the operation known to the person skilled in the art.

In some embodiments, the gas company management platform may select a candidate purification parameter with the greatest purification effect from the at least one candidate purification parameter as a current purification parameter.

In some embodiments of the present disclosure, by evaluating the purification effect and selecting an optimal purification parameter from the candidate purification parameters, the efficiency and effect of the purification process may be effectively improved, and at the same time, the utilization of resources is optimized, and the cost is reduced. By selecting the optimal purification parameter, the safety of the purification process may be ensured and potential hazards to the pipeline system or the environment may be reduced.

One or more embodiments of the present disclosure further provide an intelligent gas recovery IoT device including a processing device, the processing device being configured to perform the gas recovery method based on the intelligent gas regulatory IoT as described in any of the above embodiments.

One or more embodiments of the present disclosure further provide a computer-readable storage medium storing computer instructions. When a computer reads the computer instructions in the storage medium, the computer performs the gas recovery method based on the intelligent gas regulatory IoT as described in any one of the above embodiments.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment", "one embodiment", or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about", "approximate", or "substantially". For example, "about", "approximate", or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A gas recovery system based on an intelligent gas regulatory Internet of Things (IoT), comprising a government regulatory management platform, a government regulatory sensor network platform, a government regulatory object platform, a gas company sensor network platform, and a gas device object platform, the government regulatory object platform including a gas company management platform, wherein the government regulatory management platform, the government regulatory sensor network platform, and the government regulatory object platform interact sequentially, and the gas company management platform, the gas company sensor network platform, and the gas device object platform interact sequentially;

the gas device object platform includes a purification device, a gas storage tank group, and a temporary storage tank group; the temporary storage tank group includes at least one temporary storage tank, and the temporary storage tank is configured to store gas to be recovered; the purification device is configured to extract the gas to be recovered from the temporary storage tank group, purify the gas to be recovered, and store purified gas into the gas storage tank group; the gas storage tank group includes at least one gas storage tank, and the gas storage tank is configured to store the purified gas;

the gas device object platform includes at least one user interaction device and at least one sampling device, wherein the at least one sampling device is located in at least one preset location of a pipeline to be recovered, the sampling device is configured to extract a preset amount of pipeline gas for inspection to obtain gas inspection data, and the gas inspection data includes a gas concentration and a gas composition;

the gas company management platform is configured to:
obtain target detection data and target flow data of the pipeline to be recovered from the gas device object platform, wherein the target detection data is impurity detection data of the pipeline to be recovered in a preset time period, and the target flow data is gas flow data of the pipeline to be recovered in the preset time period;

determine, based on the target detection data and the target flow data, a gas pollution value, wherein the gas pollution value is also related to line data and the gas inspection data on at least one gas line where the pipeline to be recovered is located, and the line data includes at least one of a pipeline temperature, a pipeline air pressure, and impurity detection data of all pipelines on the at least one gas line where the pipeline to be recovered is located;

determine, based on the target detection data, a current impurity distribution;

construct an impurity map based on the gas inspection data at the at least one preset location, the line data on the at least one gas line, the current impurity distribution, and the target flow data, wherein an attribute of a node of the impurity map includes a pipeline in-degree, the pipeline in-degree indicates a count of pipeline branches of gas flowing into the node, an attribute of an edge of the impurity map includes a pollution strength value, and the pollution strength value is related to an impurity type;

determine the gas pollution value by processing the impurity map through a pollution value determination model, the pollution value determination model being a machine learning model;

determine, based on the gas pollution value and the target flow data, a purification parameter of the purification device;

determine a recovery instruction and send the recovery instruction to the at least one user interaction device via the gas device object platform, the recovery instruction instructing a staff member to store gas in the pipeline to be recovered in the temporary storage tank group; and in response to determining that a recovery completion instruction is obtained, send the purification parameter to the gas device object platform, wherein the gas device object platform is configured to generate a control instruction based on the purification parameter and send the control instruction to the purification device to control the purification device to operate according to the purification parameter.

2. The gas recovery system of claim 1, wherein the purification parameter is further related to a total gas volume within the gas storage tank group, and the government regulatory management platform is further configured to:
obtain a reference purification parameter, wherein the reference purification parameter is a pre-set parameter used to control the purification device to operate;
determine at least one candidate purification parameter based on the reference purification parameter, wherein the at least one candidate purification parameter is a series of parameters to be determined as the purification parameter;
determine, for each candidate purification parameter of the at least one candidate purification parameter, a purification effect based on the gas pollution value, the total gas volume, and the candidate purification parameter; and
determine the purification parameter based on the purification effect of the at least one candidate purification parameter.

3. The gas recovery system of claim 2, wherein the government regulatory management platform is further configured to:
construct a database of frequent items, the database of frequent items being a database for storing frequent items and supports corresponding to the frequent items, the frequent items being a combination of parameter items whose support meets a preset requirement, wherein the combination of parameter items include a parameter item or a collection composed of a plurality of parameter items, and the parameter item includes one or a combination of any one of a gas flow rate, an internal pressure, an internal temperature, or a concentration of a scrubbing fluid;

determine at least one adjustment term based on the database of frequent items, wherein the at least one adjustment term is a parameter item that needs to be adjusted; and determine the at least one candidate purification parameter based on the at least one adjustment term and the reference purification parameter.

* * * * *